(12) United States Patent
Lim et al.

(10) Patent No.: US 11,087,679 B2
(45) Date of Patent: Aug. 10, 2021

(54) PIXEL AND DISPLAY DEVICE INCLUDING THE SAME

(71) Applicant: Samsung Display Co., Ltd., Yongin-si (KR)

(72) Inventors: Jae Keun Lim, Yongin-si (KR); Jeong Kyoo Kim, Yongin-si (KR); Dong Won Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/567,705

(22) Filed: Sep. 11, 2019

(65) Prior Publication Data

US 2020/0098315 A1  Mar. 26, 2020

(30) Foreign Application Priority Data

Sep. 21, 2018 (KR) ........................ 10-2018-0114287

(51) Int. Cl.
| | |
|---|---|
| *G06F 3/042* | (2006.01) |
| *G09G 3/3233* | (2016.01) |
| *G06K 9/00* | (2006.01) |
| *G09G 3/3266* | (2016.01) |
| *G09G 3/3275* | (2016.01) |

(52) U.S. Cl.
CPC ......... *G09G 3/3233* (2013.01); *G06F 3/0421* (2013.01); *G06K 9/0004* (2013.01); *G09G 3/3266* (2013.01); *G09G 3/3275* (2013.01); *G09G 2300/0809* (2013.01); *G09G 2360/14* (2013.01)

(58) Field of Classification Search
CPC ...... G06F 3/0412; G06F 3/042; G06F 3/0421; G06K 9/0004; G09G 2300/0809; G09G 2360/14; G09G 3/3233; G09G 3/3266; G09G 3/3275

See application file for complete search history.

(56) References Cited

U.S. PATENT DOCUMENTS

| | | | |
|---|---|---|---|
| 9,733,761 B2 | 8/2017 | Ku et al. | |
| 2003/0201727 A1* | 10/2003 | Yamazaki | ............ G09G 3/3233 |
| | | | 315/169.1 |
| 2012/0091321 A1* | 4/2012 | Tanaka | .................. G06F 3/0412 |
| | | | 250/208.2 |

(Continued)

FOREIGN PATENT DOCUMENTS

| | | |
|---|---|---|
| KR | 10-2014-0077458 | 6/2014 |
| KR | 10-2016-0084941 | 7/2016 |

(Continued)

OTHER PUBLICATIONS

Extended European Search Report dated Jan. 8, 2020, issued in EP Patent Application No. 19198467.3.

*Primary Examiner* — Insa Sadio
(74) *Attorney, Agent, or Firm* — H.C. Park & Associates, PLC

(57) ABSTRACT

A pixel and a display device including the same. The pixel includes: a pixel circuit configured to control the amount of current to be supplied to an organic light-emitting diode in response to a data signal provided from a data line; and a light sensor circuit coupled between the data line and the pixel circuit and configured to control the amount of current to be supplied to the pixel circuit in response to incident light.

17 Claims, 9 Drawing Sheets

(56) References Cited

U.S. PATENT DOCUMENTS

| | | | |
|---|---|---|---|
| 2015/0268763 A1* | 9/2015 | Zhou | G09G 3/3208 |
| | | | 345/174 |
| 2016/0274719 A1 | 9/2016 | Yang et al. | |
| 2018/0150165 A1 | 5/2018 | Kim et al. | |
| 2018/0151656 A1 | 5/2018 | Choo et al. | |

FOREIGN PATENT DOCUMENTS

| KR | 10-2018-0059634 | 6/2018 |
|---|---|---|
| KR | 10-2018-0062492 | 6/2018 |

* cited by examiner

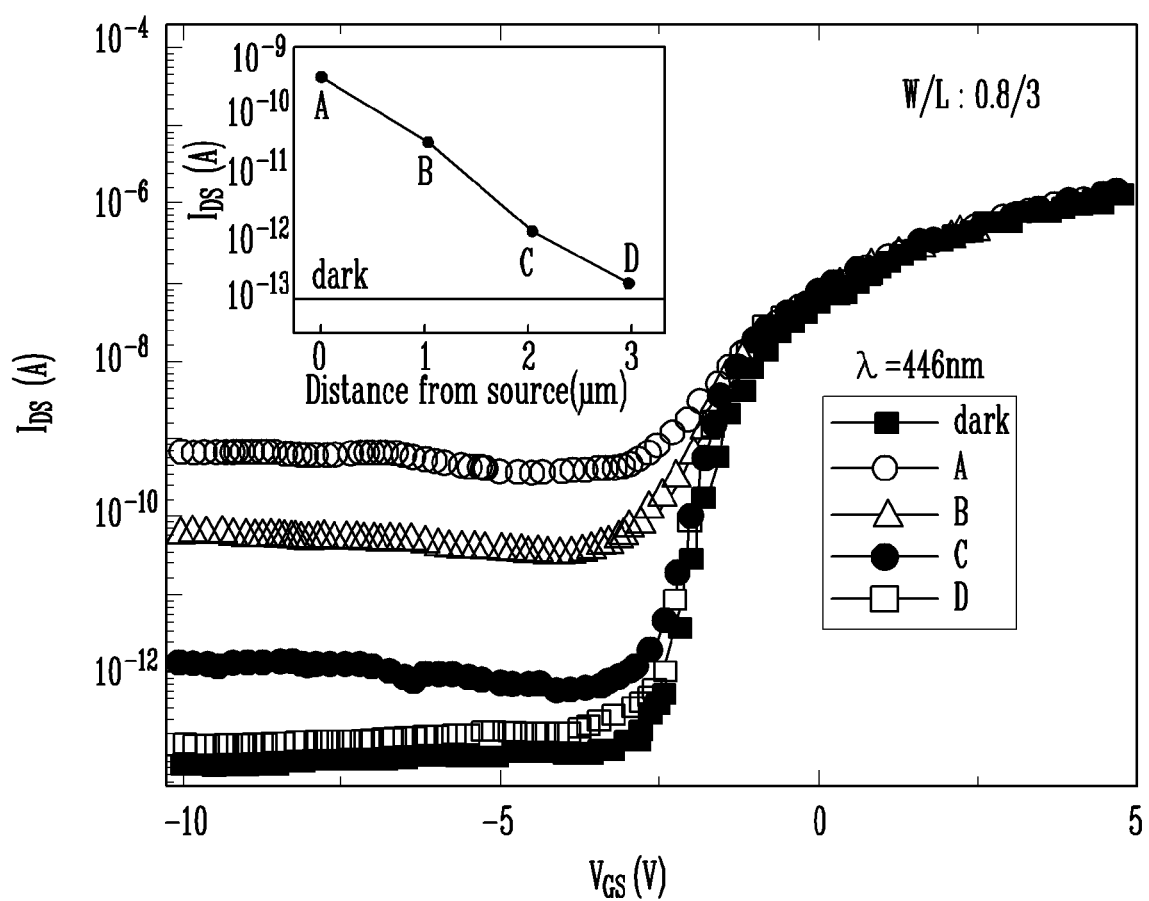

PIXEL AND DISPLAY DEVICE INCLUDING THE SAME

CROSS-REFERENCE TO RELATED APPLICATION

This application claims priority from and the benefit of Korean Patent Application No. 10-2018-0114287, filed on Sep. 21, 2018, which is hereby incorporated by reference for all purposes as if fully set forth herein.

BACKGROUND

Field

Exemplary embodiments of the present invention relate to a pixel and a display device including the pixel.

Discussion of the Background

Display devices may include a display panel configured to display an image, and a touch panel may be configured to recognize a touch when the hand of a user or a stylus pen is placed on the touch panel. A touch recognition scheme of the touch panel may be classified into various types such as a pressure resistive overlay type, a contact capacitance type, a surface acoustic wave (SAW) type, an infrared sensing type, and a piezoelectric type.

Research is being conducted on in-cell type display panels in which a touch sensor circuit is integrated with a display pixel, and research is also being conducted on a touch screen panel or the like that uses light sensing. However, as the degree of integration of a circuit in a display panel increases due to addition of the touch sensor circuit and a light sensing circuit, it is feared that a panel error rate may increase, and an opening ratio and resolution will be reduced.

The above information disclosed in this Background section is only for understanding of the background of the inventive concepts, and, therefore, it may contain information that does not constitute prior art.

SUMMARY

Devices constructed according to exemplary embodiments of the invention are directed to a pixel including a light sensing switching transistor and a light sensing element.

Furthermore, various exemplary embodiments of the inventive concepts are directed to a display device including the pixels.

Additional features of the inventive concepts will be set forth in the description which follows, and in part will be apparent from the description, or may be learned by practice of the inventive concepts.

An exemplary embodiment of the inventive concepts may provide a pixel including: a pixel circuit configured to control an amount of current to be supplied to an organic light-emitting diode in response to a data signal provided from a data line; and a light sensor circuit coupled between the data line and the pixel circuit and configured to control an amount of current to be supplied to the pixel circuit in response to incident light.

In an exemplary embodiment, the light sensor circuit may include: a light sensing switching transistor coupled to the data line; and a light sensing element coupled between the light sensing switching transistor and a gate electrode of a driving transistor included in the pixel circuit.

In an exemplary embodiment, the light sensing element may output current corresponding to the incident light to the driving transistor.

In an exemplary embodiment, the light sensing element may be an amorphous silicon thin film transistor.

In an exemplary embodiment, the light sensing element may include: a first electrode coupled to the light sensing switching transistor; a second electrode coupled to the gate electrode of the driving transistor; and a gate electrode coupled to the first electrode or the second electrode of the light sensing element.

In an exemplary embodiment, the light sensing transistor may be turned on, when a first gate signal is applied thereto through a first gate line, to electrically connect the data line with the light sensing element.

In an exemplary embodiment, the pixel circuit may include: the driving transistor; a first switching transistor coupled between the gate electrode of the driving transistor and the data line; a second switching transistor coupled between the organic light-emitting diode and a sensing line; and a capacitor coupled between the gate electrode of the driving transistor and the second switching transistor.

In an exemplary embodiment, the first switching transistor may be turned on when a second gate signal is supplied thereto through a second gate line. The second switching transistor may be turned on when a third gate signal is supplied thereto through a third gate line.

In an exemplary embodiment, while the second switching transistor is turned on, the first switching transistor and the light sensing switching transistor may be turned on at least once in different sections.

In an exemplary embodiment, when the light sensing switching transistor and the second switching transistor are turned on, at least one of a voltage or current of the sensing line may be controlled in response to the amount of current supplied from the light sensing element to the pixel circuit.

An exemplary embodiment of the inventive concepts may provide a display device including: a plurality of pixels coupled to gate lines and data lines; a gate driver configured to provide a gate signal to each of the gate lines; a data driver configured to provide a data signal to each of the data lines; and a timing controller configured to control the gate driver and the data driver. Each of the plurality of pixels may include: a pixel circuit configured to control an amount of current to be supplied to an organic light-emitting diode in response to the data signal provided from a corresponding one of the data lines; and a light sensor circuit coupled between the data line and the pixel circuit and configured to control an amount of current to be supplied to the pixel circuit in response to incident light. The timing controller may sense a touch input or a fingerprint in response to the amount of current.

In an exemplary embodiment, the light sensor circuit may include: a light sensing switching transistor coupled to the corresponding data line; and a light sensing element coupled between the light sensing switching transistor and a gate electrode of a driving transistor included in the pixel circuit.

In an exemplary embodiment, the light sensing element may include: a first electrode coupled to the light sensing switching transistor; a second electrode coupled to the gate electrode of the driving transistor; and a gate electrode coupled to the first electrode or the second electrode of the light sensing element.

In an exemplary embodiment, the pixel circuit may include: the driving transistor; a first switching transistor coupled between the gate electrode of the driving transistor and the corresponding data line; a second switching transistor coupled between the organic light-emitting diode and a sensing line; and a capacitor coupled between the gate electrode of the driving transistor and the second switching transistor.

In an exemplary embodiment, the light sensing switching transistor may be coupled to a first gate line. The first switching transistor may be coupled to a second gate line. The second switching transistor may be coupled to a third gate line.

In an exemplary embodiment, while a third gate signal is supplied to the third gate line, a first gate signal and a second gate signal may be respectively supplied at least once to the first gate line and the second gate line, wherein the first gate signal and the second gate signal may be supplied in different sections.

In an exemplary embodiment, during an initialization period in which the second gate signal is supplied, the first switching transistor may be configured to supply, to the gate electrode of the driving transistor, a first reference voltage applied to the data line. During the initialization period, the second switching transistor may be configured to supply, to a common node of the driving transistor and the organic light-emitting diode, an initialization voltage supplied to the sensing line.

In an exemplary embodiment, during the initialization period, a driving voltage of the driving transistor may be initialized to a voltage corresponding to a difference between the first reference voltage and the initialization voltage.

In an exemplary embodiment, during a sensing period in which the first gate signal is supplied, the light sensing switching transistor may be configured to supply, to the light sensing element, a second reference voltage applied to the data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 3 is a graph illustrating current characteristic changes of a light sensing element in accordance with an exemplary embodiment.

DETAILED DESCRIPTION

Figure 1:
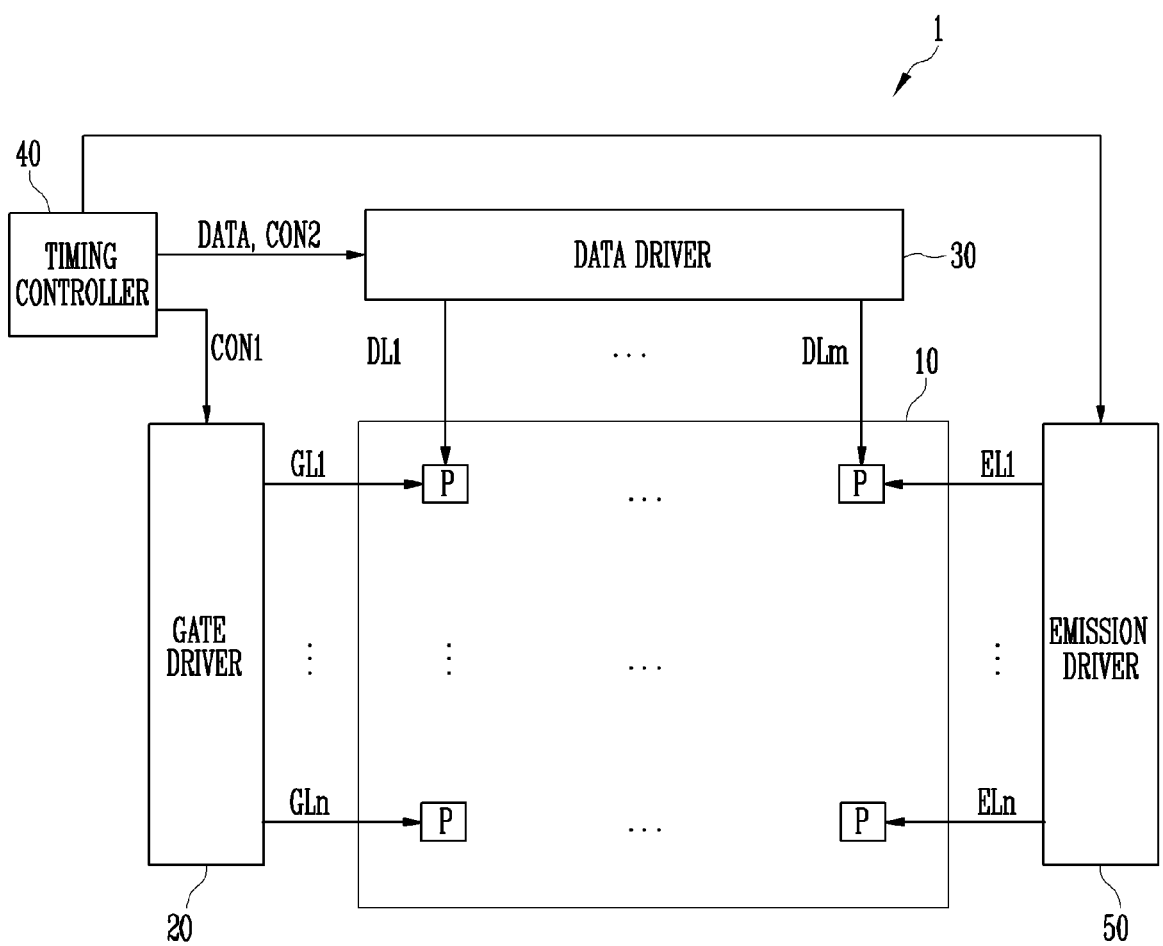
FIG. 1 is a block diagram illustrating a display device in accordance with an exemplary embodiment of the inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a display device and a method of driving the same in accordance with an exemplary embodiment of the inventive concepts will be described with reference to the accompanying drawings.

FIG. 1 is a block diagram illustrating a display device in accordance with an exemplary embodiment.

Referring to FIG. 1, the display device 1 may include a display panel 10, a gate driver 20, a data driver 30, and a timing controller 40.

The display panel 10 may be implemented as an organic light-emitting display panel, or the like. The display panel 10 may include a plurality of pixels P to display an image. In an exemplary embodiment, at least some of the pixels P may include a light sensor circuit configured to sense a touch location and/or the fingerprint of a user through a light sensing operation. In other words, in an exemplary embodiment, the display panel 10 may include at least one pixel including the light sensor circuit, and at least one general pixel including no light sensor circuit. In this exemplary embodiment, the at least one pixel including the light sensor circuit may be disposed between general pixels at predetermined intervals. The predetermined intervals may be regular or irregular. In an exemplary embodiment, all of the pixels P may include respective light sensor circuits.

Each pixel including the light sensor circuit may further include a light sensor circuit, and a pixel circuit coupled with the light sensor circuit. The light sensor circuit may include a light sensing switching transistor coupled to a corresponding one of gate lines, and a light sensing element which is coupled in series with the light sensing switching transistor and varies in electrical characteristics in response to incident light.

An i-th gate signal and an i+1-th gate signal (here, i is a natural number) may be applied to the pixel circuit, and an i+2-th gate signal may be applied to the light sensor circuit. In other words, a pixel circuit disposed on an i-th pixel row may be coupled to an i-th gate line GLi and an i+1-th gate line GLi+1. The light sensing switching transistor of the light sensor circuit may be coupled with an i+2-th gate line GLi+2.

The light sensing switching transistor of the light sensor circuit may be turned on when an i+2-th gate signal is enabled.

The light sensing element of the light sensor circuit may be an element which is sensitive to external light, and may be, for example, an amorphous silicon (a-Si) thin film transistor (TFT). However, the inventive concepts are not limited thereto, and the light sensing element may be formed of any transistor or element having high light sensitivity.

The light sensing element may vary in electrical characteristics depending on the quantity (intensity) of incident light. For example, in the case where the light sensing element is configured as a light sensing transistor, the light sensing element may generate a predetermined amount of current by the intensity of incident light when a gate voltage lower than a threshold voltage is applied thereto. If the intensity of light which is incident on the light sensing element is changed by touch input of the user, the light sensing element may generate current corresponding to the changed intensity of light.

Current generated from the light sensing element may be provided in the form of sensing current or sensing voltage to an external sensing unit or the like through a sensing line. Based on the sensing current or the sensing voltage, the sensing unit may determine whether touch input of the user has been generated and/or identify the ridges and the valleys of the fingerprint of the user.

Detailed exemplary embodiments of the light sensor circuit will be described in more detail with reference to FIGS. 5 to 9.

The gate driver 20 may provide gate signals to the pixels P of the display panel 10 through gate lines GL1, . . . , GLn, based on a first control signal CON1 received from the timing controller 40.

The data driver 30 may provide data signals to data lines DL1, . . . , DLm based on a second control signal CON2 and image data DATA that are received from the timing controller 40.

The timing controller 40 may generate the first and second control signals CON1 and CON2, and provide the first and second control signals CON1 and CON2 to the gate driver 20 and the data driver 30, respectively, thus controlling the gate driver 20 and the data driver 30. In an exemplary embodiment, the timing controller 40 may include the above-mentioned sensing unit.

In various exemplary embodiments, the display device 1 may further include an emission driver 50. The emission driver 50 may supply emission control signals to emission control lines EL1, . . . , ELn in response to an emission driver control signal ECS supplied from the timing controller 40.

Hereinafter, detailed exemplary embodiments of the pixel including the light sensor circuit in accordance with the present disclosure will be described.

Figure 2A:
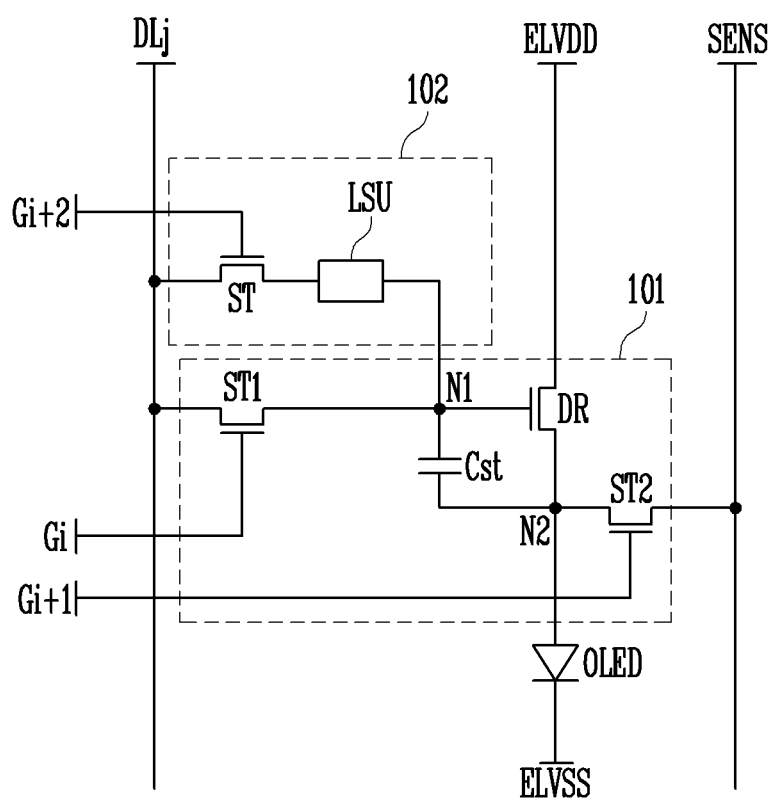
FIG. 2A and FIG. 2B are circuit diagrams illustrating pixels in accordance with exemplary embodiments.
Figure 2B:
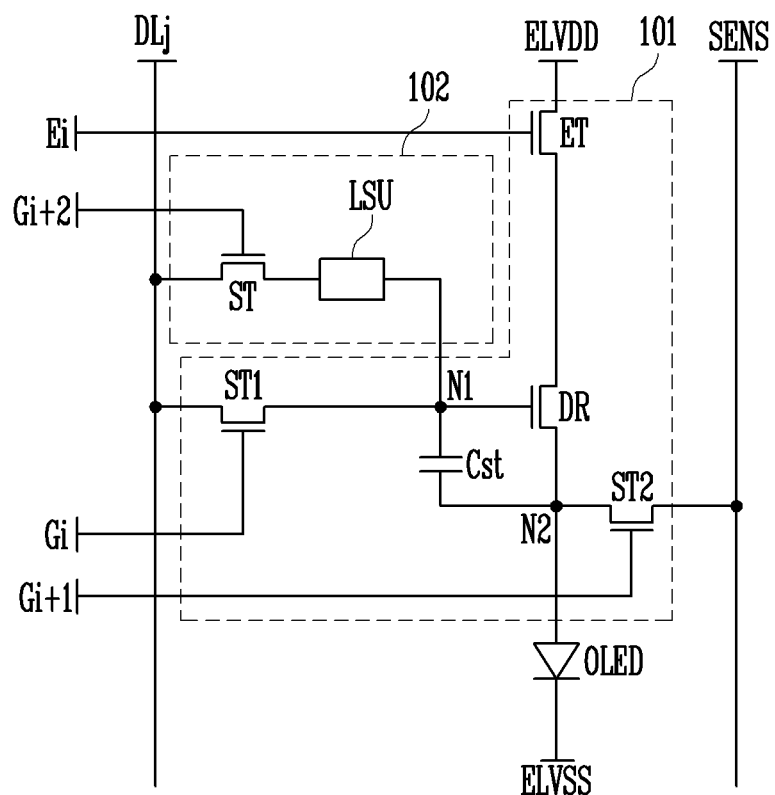
Figure 4:
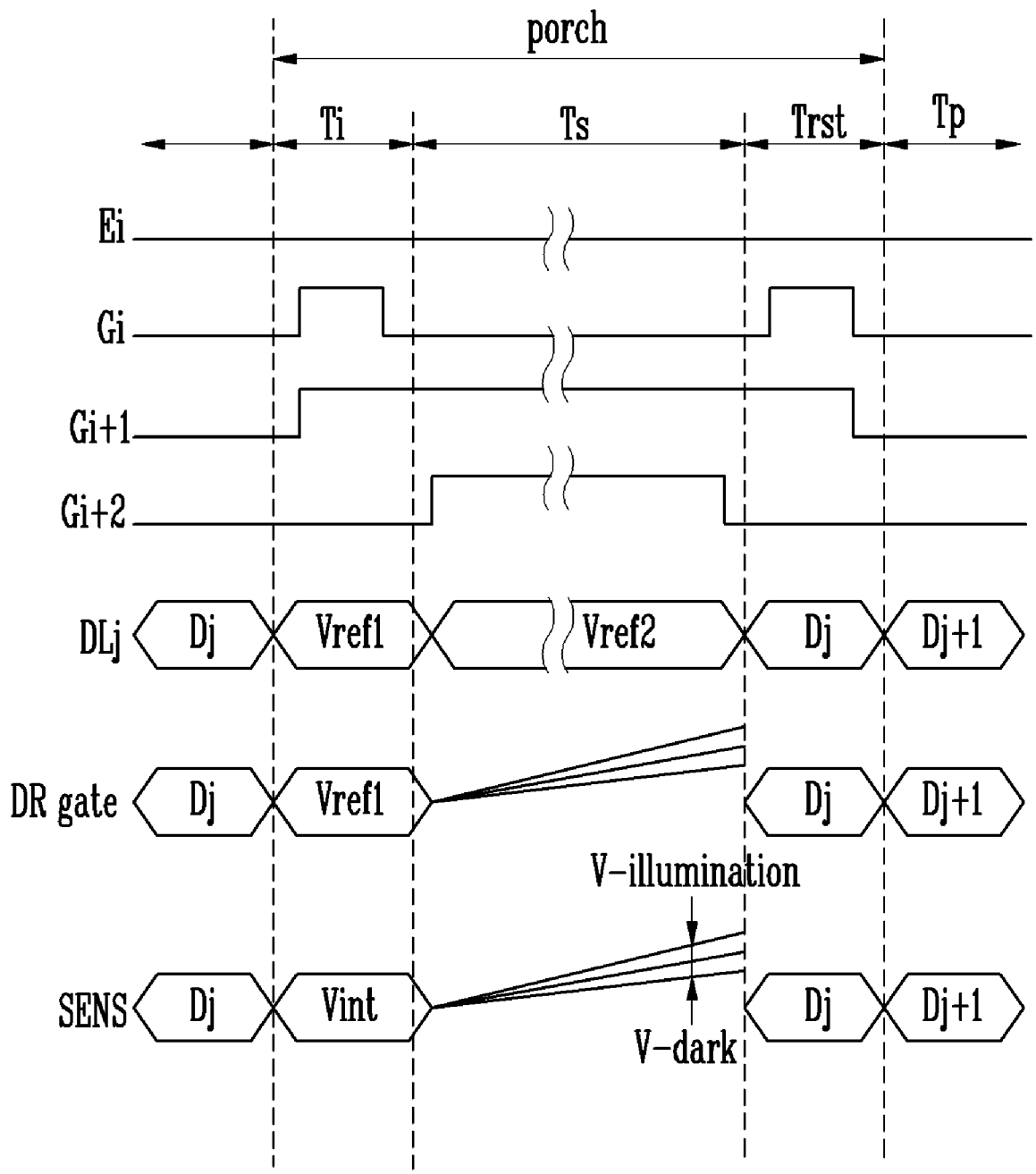
FIG. 4 is a timing diagram for describing a driving operation of a pixel in accordance with an exemplary embodiment.

FIGS. 2A and 2B are circuit diagrams illustrating pixels. FIG. 3 is a graph illustrating current characteristic changes of a light sensing element in accordance with the inventive concepts. FIG. 4 is a timing diagram for describing a driving operation of a pixel in accordance with the inventive concepts.

FIG. 2A and FIG. 2B illustrate examples of a pixel including a light sensor circuit 102 which is disposed on an i-th pixel row and a j-th pixel column.

Referring to FIGS. 2A and 2B, a pixel P in accordance with an exemplary embodiment may include a pixel circuit 101 and a light sensor circuit 102.

The pixel circuit 101 may include a first switching transistor ST1 which is turned on by an i-th gate signal Gi, and a driving transistor DR which allows an emission element to emit light based on a data signal Dj (see FIG. 4) provided from a j-th data line (hereinafter, referred to as a data line) DLj. For example, the pixel circuit 101 may have a 3T1C pixel circuit structure illustrated in FIG. 2A, and a 4T1C pixel circuit structure illustrated in FIG. 2B.

Referring to FIG. 2A, the pixel circuit 101 in accordance with an exemplary embodiment may include an organic light-emitting diode OLED, a first switching transistor ST1, a driving transistor DR, a capacitor Cst, and a second switching transistor ST2.

The organic light-emitting diode OLED may emit light having predetermined luminance corresponding to driving current supplied from the driving transistor DR. A first electrode of the organic light-emitting diode OLED may be coupled to a second node N2, and a second electrode thereof may be coupled to a second power supply ELVSS. In an exemplary embodiment, the first electrode may be an anode electrode, and the second electrode may be a cathode electrode. In various exemplary embodiments, the organic light-emitting diode OLED may be replaced with a known emission element such as a quantum-dot diode (QLED).

The first switching transistor ST1 may include a gate electrode which receives the i-th gate signal Gi, a first electrode coupled to the data line DLj, and a second electrode coupled to a first node N1. In an exemplary embodiment, the first electrode may be a source electrode, and the second electrode may be a drain electrode. However, this is only an illustrative example. In an exemplary embodiment, the first electrode may be the drain electrode, and the second electrode may be the source electrode. The first switching transistor ST1 may be turned on when the i-th gate signal Gi is enabled, thus allowing a voltage supplied through the data line DLj to be stored in the capacitor Cst.

The driving transistor DR may include a gate electrode coupled to the first node N1, a first electrode coupled to a first power supply ELVDD, and a second electrode coupled to the second node N2 of the organic light-emitting diode OLED. The driving transistor DR may be operated to allow driving current to flow between the first power supply ELVDD and the second power supply ELVSS depending on a voltage stored in the capacitor Cst.

The capacitor Cst may be coupled between the first node N1 and the second node N2. The capacitor Cst may store, while the first switching transistor ST1 is turned on, a voltage corresponding to a difference between a voltage supplied through the first switching transistor ST1 and a voltage supplied through the second switching transistor ST2.

The second switching transistor ST2 may be operated as a sensing transistor for a compensation circuit CC. The second switching transistor ST2 may include a gate electrode which receives the i+1-th gate signal Gi+1, a first electrode coupled to the driving transistor DR through the second node N2, and a second electrode coupled to a sensing line SENS. The sensing line SENS may sense the second node N2 coupled with the driving transistor DR through the second switching transistor ST2, and supply an initialization voltage Vint to the second node N2. The second switching transistor ST2 may be used as a path for supplying current flowing through the driving transistor DR and/or the voltage of the second node N2 to the sensing line SENS during a sensing period Ts (see FIG. 4).

Referring to FIG. 2B, a pixel circuit 101 in accordance with an exemplary embodiment may further include an emission control transistor ET, compared to the exemplary embodiment of FIG. 2A. The emission control transistor ET may be coupled between the first power supply ELVDD and the driving transistor DR. When an i-th emission control signal Ei+2 is enabled, the emission control transistor ET is turned on to supply the first power supply voltage ELVDD to the driving transistor DR, thus controlling an emission time of the organic light-emitting diode OLED.

In the following descriptions, various exemplary embodiments of the pixel P will be described with regard to the case where the pixel circuit 101 has a 4T1C pixel circuit structure, as shown in FIG. 2B. However, the inventive concepts are not limited thereto, and the pixel circuit may have various known pixel circuit structures as well as the above-described 3T1C or 4T1C pixel circuit structure.

The light sensor circuit 102 may include a light sensing switching transistor ST and a light sensing element LSU which are coupled in series between the data line DLj and the first node N1.

A first electrode of the light sensing switching transistor ST may be coupled to the data line DLj, and a second electrode thereof may be coupled to the light sensing element LSU. In an exemplary embodiment, the first electrode may be a source electrode, and the second electrode may be a drain electrode. However, this is only an illustrative example. In an exemplary embodiment, the first electrode may be the drain electrode, and the second electrode may be the source electrode.

The light sensing switching transistor ST may be turned on during a period in which the i+2-th gate signal Gi+2 is enabled, as illustrated in FIG. 4. The period during which the light sensing switching transistor ST is turned on may correspond to a sensing period Ts of the light sensor circuit 102. During the sensing period Ts, the light sensing switching transistor ST may be turned on to electrically connect the data line DLj with the light sensing element LSU and provide, to the light sensing element LSU, a voltage applied from the data line DLj.

A first end of the light sensing element LSU may be coupled to the light sensing switching transistor ST, and a second end thereof may be coupled to the first node N1 of the pixel circuit 101. The light sensing element LSU may sense incident light. The light sensing element LSU may be an element having high light sensitivity and vary in electrical characteristics depending on the intensity of incident light.

In various exemplary embodiments, the light sensing element LSU may be a transistor, particularly, an amorphous silicon (a-Si) TFT. When the light sensing element LSU is configured as a transistor, a first electrode of the light sensing element LSU may be coupled to the light sensing switching transistor ST, and a second electrode thereof may be coupled to the gate electrode of the driving transistor of the pixel circuit 101. Here, the first electrode may be a drain electrode, and the second electrode may be a source electrode. In some exemplary embodiments, the first electrode may be the source electrode, and the second electrode may be drain electrode. In these exemplary embodiments, as illustrated in FIG. 3, in the light sensing element LSU, $I_{DS}$ may be vary depending on the intensity of incident light with respect to the same $V_{GS}$. Exemplary embodiments in which the light sensing element LSU is configured as a transistor, as described above, will be described in more detail with reference to FIGS. 5 and 6.

The light sensing element LSU may generate current corresponding to the intensity of incident light during the sensing period Ts. The generated current may flow from the first electrode of the light sensing element LSU to the second electrode thereof. Furthermore, the generated current may be supplied, through the first node N1, to the gate electrode of the driving transistor DR that is coupled to the second electrode of the light sensing element LSU. The voltage on the gate electrode of the driving transistor DR may vary depending on the current generated from the light sensing element LSU. If the voltage of the gate electrode of the driving transistor DR varies, leakage current from the driving transistor DR may vary. Thereby, the voltage and current of the sensing line SENS coupled to the driving transistor DR through the second switching transistor ST2 may vary. Therefore, based on the voltage or current on any node of the sensing line SENS, the intensity of incident light may be calculated.

In various exemplary embodiments, the sensing unit may determine that a touch of the user has been generated when the intensity of incident light is greater than a preset threshold value, and may determine that there is no touch when the intensity of incident light is less than the preset threshold value.

In various exemplary embodiment, the sensing unit may determine that a touch has been generated by the ridges of the fingerprint of the user when the intensity of incident light is greater than a first threshold value. The sensing unit may determine that a touch has been generated by the valleys of the fingerprint of the user when the intensity of incident light is less than the first threshold value and greater than a second threshold value. Furthermore, the sensing unit may determine that there is no touch when the intensity of incident light is less than the second threshold value When the above-described light sensing operation is performed on all of the pixels P of the display panel 10, the sensing unit may determine a touch generation location and identify the fingerprint of the user by extracting the ridges of the fingerprint.

Referring FIG. 4, the pixel P in accordance with the present disclosure may be operated in a sequence of an initialization period Ti, a sensing period Ts, a reset period Trst, and a programming period Tp.

During the initialization period Ti, the first switching transistor ST1 and the second switching transistor ST2 are respectively turned on by the i-th gate signal Gi and the i+1-th gate signal Gi+1.

A first reference voltage Vref1 is supplied to the data line DLj during the initialization period Ti. The first switching transistor ST1 may be turned on so that the first reference voltage Vref1 may be supplied to the first node N1.

Furthermore, during the initialization period Ti, the initialization voltage Vint is supplied to the sensing line SENS. In an exemplary embodiment, the initialization voltage Vint may be set to a voltage identical with or different from the first reference voltage Vref1. The second switching transistor ST2 may be turned on so that the initialization voltage Vint may be supplied to the second node N2.

As such, during the initialization period Ti, the voltage of the first node N1 may be initialized to the first reference voltage Vref1, and the voltage of the second node N2 may be initialized to the initialization voltage Vint. As the voltage of the first node N1 and the voltage of the second node N2 are initialized, a voltage corresponding to a difference between the first reference voltage Vref1 and the initialization voltage Vint may be charged into the capacitor Cst, and $V_{GS}$ of the driving transistor DT may be set to a required level.

During the sensing period Ts, the second switching transistor ST2 and the light sensing switching transistor ST are respectively turned on by the i+1-th gate signal Gi+1 and the i+2-th gate signal Gi+2. Furthermore, during the sensing period Ts, the i-th gate signal Gi is disabled so that the first switching transistor ST1 is turned off.

A second reference voltage Vref2 is supplied to the data line DLj during the sensing period Ts. The second reference voltage Vref2 may be a voltage different from the first reference voltage Vref1 and have any level allowing current to flow to the pixel circuit. For example, the second reference voltage Vref2 may be a voltage greater than 4 V.

The second reference voltage Vref2 that is supplied to the data line DLj through the light sensing switching transistor ST turned-on is supplied to the first electrode of the light sensing element LSU. The second electrode of the light sensing element LSU is supplied with the voltage of the first node N1 that has been initialized during the initialization period Ti. During the sensing period Ts, the light sensing element LSU may generate a predetermined amount of current, in response to the voltages supplied to the opposite electrodes thereof and the intensity of incident light. The current generated from the optical sensing element LSU may be supplied to the gate electrode of the driving transistor DR. Depending on the current generated from the optical sensing element LSU, the gate electrode of the driving transistor DR may vary, whereby the voltage of the sensing line SENS may also vary.

The sensing unit provided in the display device 1 may sense the voltage or current on any node of the sensing line SENS, thus sensing a touch or the fingerprint of the user.

During the reset period Trst, the pixel circuit 101 may be reset to perform a display operation of a subsequent frame. To this end, during the reset period Trst, the first switching transistor ST1 and the second switching transistor ST2 are respectively turned on by the i-th gate signal Gi and the i+1-th gate signal Gi+1. During the reset period Trst, the data line DLj may supply the data signal Dj of the current frame. The capacitor Cst stores the voltage supplied through the data line DLj, thereby allowing the pixel circuit 101 to be reset to the status pervious to the light sensing operation.

In various exemplary embodiments, the initialization period Ti, the sensing period Ts, and the reset period Trst may be included in a porch period.

After the porch period, during the programming period Tp, a data signal Dj+1 of the subsequent frame is supplied through the data line DLj, and a data voltage is written to the capacitor Cst.

Although not illustrated, during an emission period after the programming period Tp, the organic light-emitting diode OLED may emit light corresponding to driving current of the driving transistor DR that is generated based on the data voltage stored in the capacitor Cst.

Figure 5:
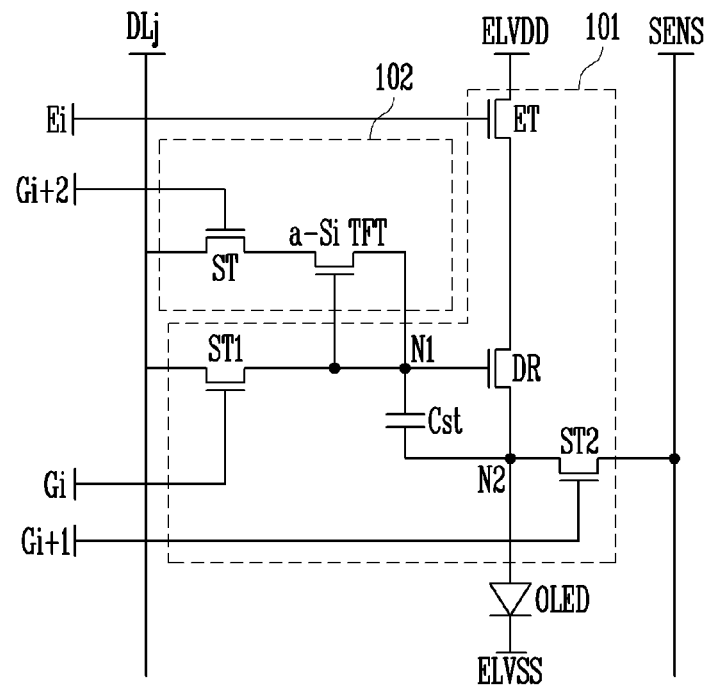
FIG. 5 is a circuit diagram illustrating a pixel in accordance with a first exemplary embodiment.
Figure 6:
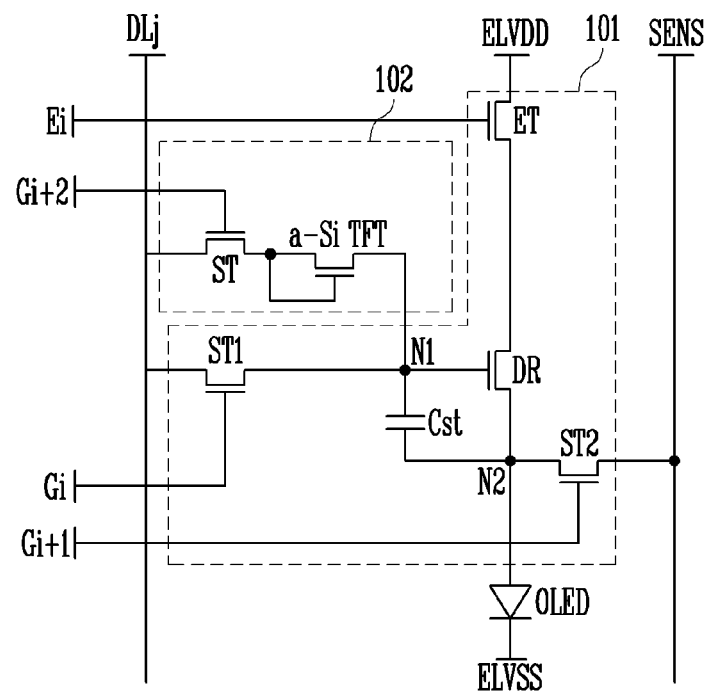
FIG. 6 is a circuit diagram illustrating a pixel in accordance with a second exemplary embodiment.

FIG. 5 is a circuit diagram illustrating a pixel in accordance with a first exemplary embodiment, and FIG. 6 is a circuit diagram illustrating a pixel in accordance with a second exemplary embodiment.

Referring to FIGS. 5 and 6, in the first and second exemplary embodiments, the light sensing element LSU of the light sensor circuit 102 may be formed of, e.g., an amorphous silicon (a-Si) thin film transistor (TFT). The first electrode of the light sensing element LSU may be coupled to the light sensing switching transistor ST, and the second electrode thereof may be coupled to the gate electrode of the driving transistor of the pixel circuit 101.

In the first exemplary embodiment, the gate electrode of the light sensing element LSU may be diode-connected to the second electrode. In this embodiment, the voltage (e.g., the second reference voltage Vref2) that is supplied to the data line DLj during the sensing period Ts may be set to be higher than the voltage of the first node N1 that is initialized during the initialization period Ti.

On the other hand, in the second exemplary embodiment, the gate electrode of the light sensing element LSU may be diode-connected to the first electrode. In this exemplary embodiment, the voltage (e.g., the second reference voltage Vref2) that is supplied to the data line DLj during the sensing period Ts may be set to be lower than the voltage of the first node N1 that is initialized during the initialization period Ti.

Figure 7:
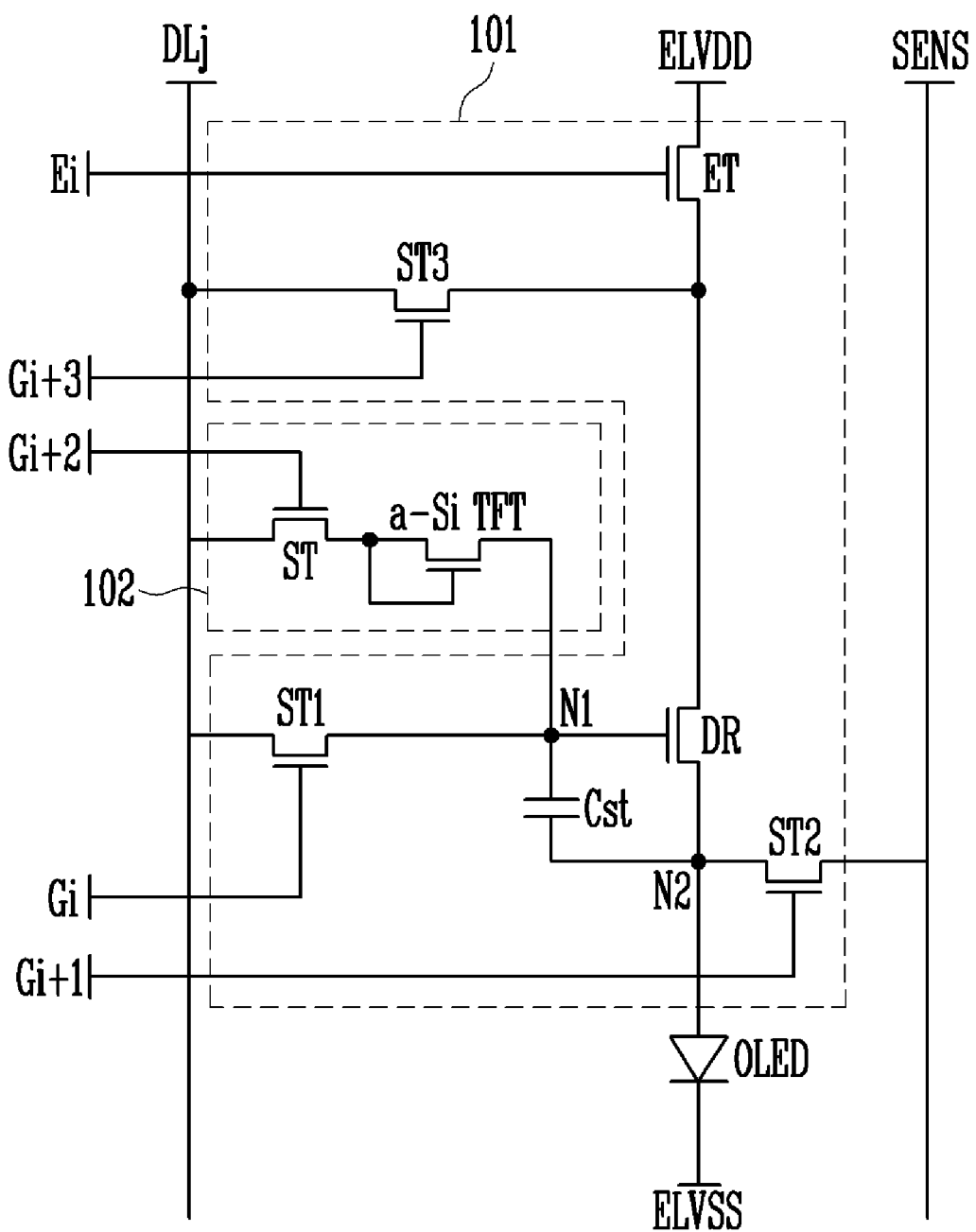
FIG. 7 is a circuit diagram illustrating a pixel in accordance with a third exemplary embodiment.

FIG. 7 is a circuit diagram illustrating a pixel in accordance with a third exemplary embodiment.

Referring to FIG. 7, the pixel circuit 101 of the pixel P in accordance with the third exemplary embodiment may further include a third switching transistor ST3 compared to the exemplary embodiments of FIGS. 5 and 6. The third switching transistor ST3 may include a first electrode coupled to the data line DLj, and a second electrode coupled to the first electrode of the driving transistor DR. The third switching transistor ST3 may be turned on by an i+3-th gate signal Gi+3. The third switching transistor ST3 may be provided to be turned along with the first and second switching transistors ST1 and ST2 to measure a threshold voltage Vth of the driving transistor DR.

Figure 8:
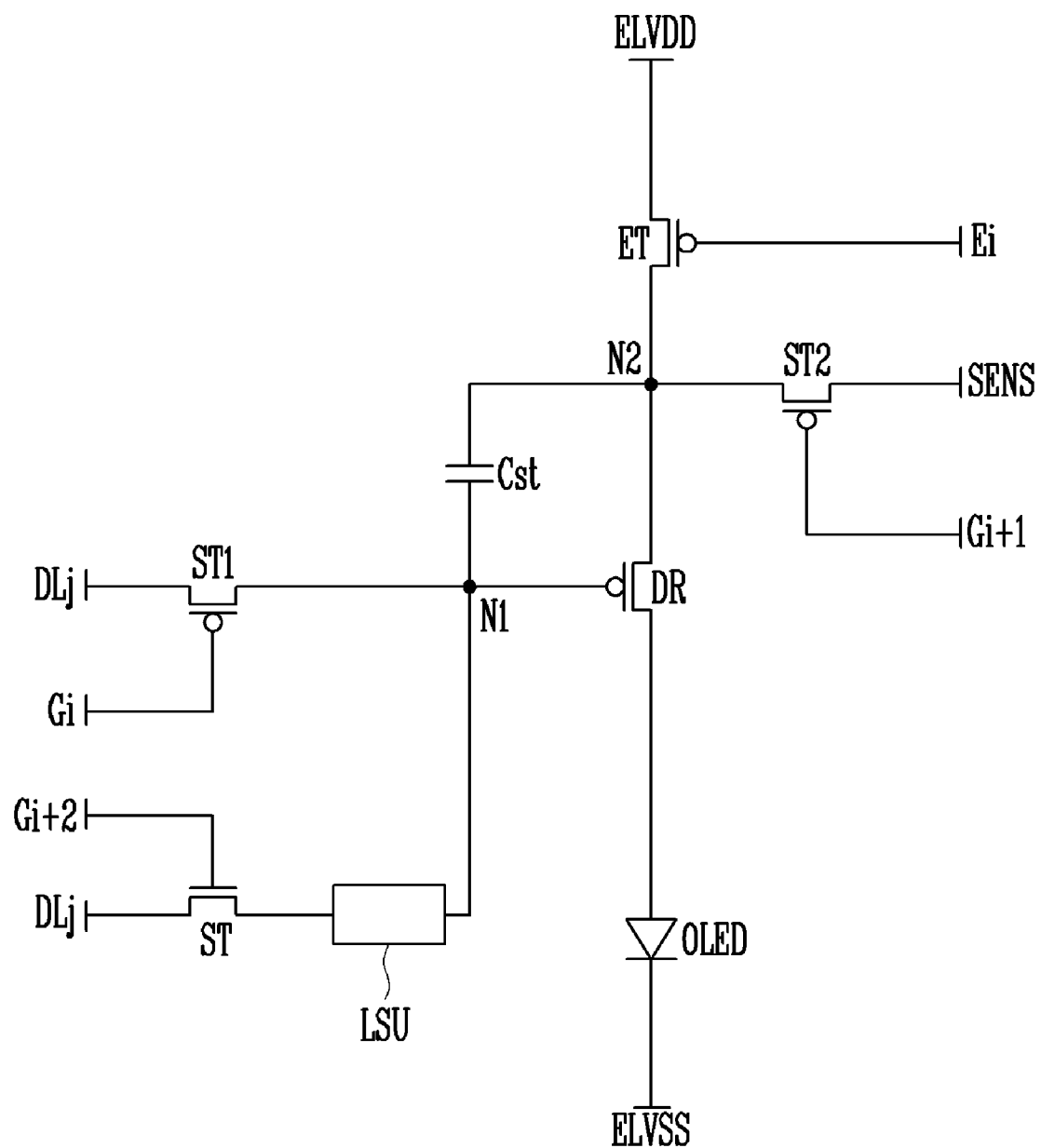
FIG. 8 is a circuit diagram illustrating a pixel in accordance with a fourth exemplary embodiment.
Figure 9:
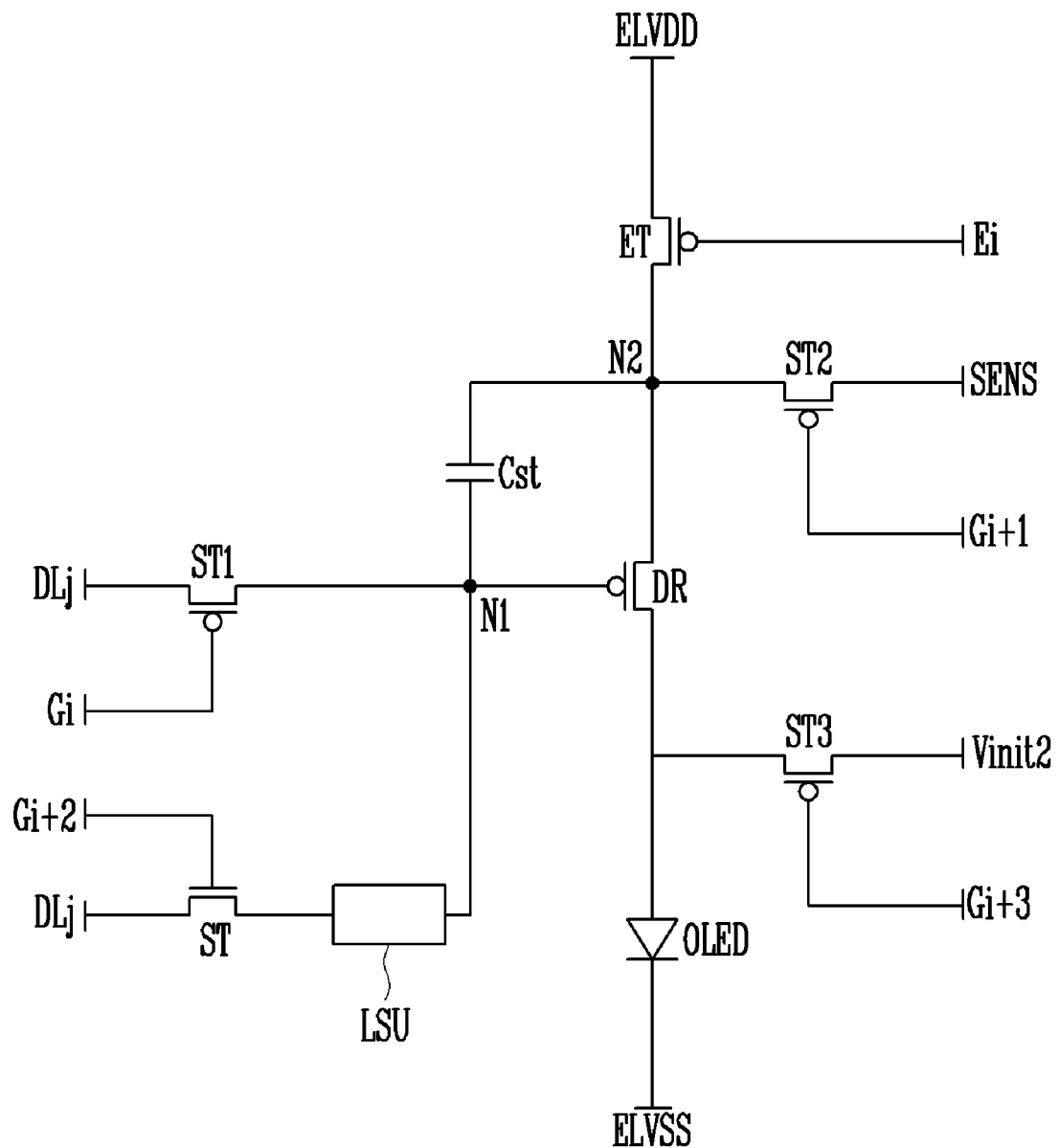
FIG. 9 is a circuit diagram illustrating a pixel in accordance with a fifth exemplary embodiment.

FIG. 8 is a circuit diagram illustrating a pixel in accordance with a fourth exemplary embodiment, and FIG. 9 is a circuit diagram illustrating a pixel in accordance with a fifth exemplary embodiment.

In the exemplary embodiments of FIGS. 2B and 7, it is illustrated that each of the transistors included in the pixel P is an N-type transistor. However, in various exemplary embodiments, each of the transistors may be implemented in the form of a P-type transistor. The general configuration and characteristics of the exemplary embodiments of the pixel P illustrated in FIGS. 8 and 9, other than configurations and characteristics varying depending on the types of transistors, are the same as those of the exemplary embodiments of FIGS. 2B and 7; therefore, detailed explanation thereof will be omitted.

In an exemplary embodiment, the pixel P may be formed of a combination of N-type and P-type transistors.

A pixel and a display device including the same in accordance with the inventive concepts may sense a touch or the fingerprint of a user using a simple structure including a light sensing switching transistor and a light sensing element, thus reducing an area of a circuit required to sense the touch or the fingerprint, and increasing sensing precision.

Furthermore, the pixel and the display device including the same in accordance with the inventive concepts may embody an in-cell type touch sensor pixel, thus making it possible to embody a touch panel without requiring additional processes and manufacturing costs for forming the touch sensor pixel.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel comprising:
   a pixel circuit configured to control an amount of current to be supplied to a light-emitting diode in response to a data signal provided from a data line; and
   a light sensor circuit coupled between the data line and the pixel circuit and configured to control an amount of current to be supplied to the pixel circuit in response to incident light,
   wherein the light sensor circuit comprises:
      a light sensing switching transistor directly coupled to the data line; and
      a light sensing element directly coupled between the light sensing switching transistor and a gate electrode of a driving transistor included in the pixel circuit, and
   wherein the pixel circuit comprises:
      the driving transistor;
      a first switching transistor coupled between the gate electrode of the driving transistor and the data line;
      a second switching transistor coupled between the light-emitting diode and a sensing line; and a capacitor coupled between the gate electrode of the driving transistor and the second switching transistor.

2. The pixel according to claim 1, wherein the light sensing element outputs current corresponding to the incident light to the driving transistor.

3. The pixel according to claim 2, wherein the light sensing element comprises an amorphous silicon thin film transistor.

4. The pixel according to claim 2, wherein the light sensing element comprises:
a first electrode coupled to the light sensing switching transistor;
a second electrode coupled to the gate electrode of the driving transistor; and
a gate electrode coupled to the first electrode or the second electrode of the light sensing element.

5. The pixel according to claim 1, wherein the light sensing switching transistor is turned on, when a first gate signal is applied thereto through a first gate line, to electrically connect the data line with the light sensing element.

6. The pixel according to claim 5,
wherein the first switching transistor is configured to be turned on when a second gate signal is supplied thereto through a second gate line, and
wherein the second switching transistor is configured to be turned on when a third gate signal is supplied thereto through a third gate line.

7. The pixel according to claim 6, wherein, while the second switching transistor is turned on, the first switching transistor and the light sensing switching transistor are turned on at least once in different sections.

8. The pixel according to claim 6, wherein, when the light sensing switching transistor and the second switching transistor are turned on, at least one of a voltage or current of the sensing line is controlled in response to the amount of current supplied from the light sensing element to the pixel circuit.

9. A display device comprising:
a plurality of pixels coupled to gate lines and data lines;
a gate driver configured to provide a gate signal to each of the gate lines;
a data driver configured to provide a data signal to each of the data lines; and
a timing controller configured to control the gate driver and the data driver,
wherein each of the plurality of pixels comprises:
a pixel circuit configured to control an amount of current to be supplied to an organic light-emitting diode in response to the data signal provided from a corresponding one of the data lines; and
a light sensor circuit coupled between the data line and the pixel circuit and configured to control an amount of current to be supplied to the pixel circuit in response to incident light,
wherein the timing controller senses a touch input or a fingerprint in response to the amount of current to be supplied to the pixel circuit in response to the incident light.

10. The display device according to claim 9, wherein the light sensor circuit comprises:
a light sensing switching transistor coupled to the corresponding data line; and
a light sensing element coupled between the light sensing switching transistor and a gate electrode of a driving transistor included in the pixel circuit.

11. The display device according to claim 10, wherein the light sensing element comprises:
a first electrode coupled to the light sensing switching transistor;
a second electrode coupled to the gate electrode of the driving transistor; and
a gate electrode coupled to the first electrode or the second electrode of the light sensing element.

12. The display device according to claim 11, wherein the pixel circuit comprises:
the driving transistor;
a first switching transistor coupled between the gate electrode of the driving transistor and the corresponding data line;
a second switching transistor coupled between the organic light-emitting diode and a sensing line; and
a capacitor coupled between the gate electrode of the driving transistor and the second switching transistor.

13. The display device according to claim 12,
wherein the light sensing switching transistor is coupled to a first gate line,
wherein the first switching transistor is coupled to a second gate line, and
wherein the second switching transistor is coupled to a third gate line.

14. The display device according to claim 13, wherein, while a third gate signal is supplied to the third gate line, a first gate signal and a second gate signal are respectively configured to be supplied at least once to the first gate line and the second gate line, wherein the first gate signal and the second gate signal are supplied in different sections.

15. The display device according to claim 14,
wherein, during an initialization period in which the second gate signal is supplied, the first switching transistor is configured to supply, to the gate electrode of the driving transistor, a first reference voltage applied to the data line, and
wherein, during the initialization period, the second switching transistor is configured to supply, to a common node of the driving transistor and the organic light-emitting diode, an initialization voltage supplied to the sensing line.

16. The display device according to claim 15, wherein, during the initialization period, a driving voltage of the driving transistor is configured to be initialized to a voltage corresponding to a difference between the first reference voltage and the initialization voltage.

17. The display device according to claim 15, wherein, during a sensing period in which the first gate signal is supplied, the light sensing switching transistor is configured to supply, to the light sensing element, a second reference voltage applied to the data line.

* * * * *